United States Patent
Nagori

(10) Patent No.: US 8,238,429 B2
(45) Date of Patent: Aug. 7, 2012

(54) STATISTICALLY CYCLE OPTIMIZED BOUNDING BOX FOR HIGH DEFINITION VIDEO DECODING

(75) Inventor: Soyeb N. Nagori, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 1596 days.

(21) Appl. No.: 11/566,295

(22) Filed: Dec. 4, 2006

(65) Prior Publication Data
US 2007/0176938 A1    Aug. 2, 2007

Related U.S. Application Data

(60) Provisional application No. 60/741,921, filed on Dec. 2, 2005.

(51) Int. Cl.
*H04N 7/28*    (2006.01)
(52) U.S. Cl. .................. 375/240.16; 375/240.24

(58) Field of Classification Search ............. 375/240.16, 375/240.24
See application file for complete search history.

(56) References Cited

U.S. PATENT DOCUMENTS
2005/0169378 A1*  8/2005  Kim et al. ............... 375/240.16
* cited by examiner

*Primary Examiner* — Sath V Perungavoor
*Assistant Examiner* — Jeffery Williams
(74) *Attorney, Agent, or Firm* — Robert D. Marshall, Jr.; Wade James Brady, III; Frederick J. Telecky, Jr.

(57) ABSTRACT

A method for conserving memory accesses in motion compensation of compressed video gathers a plurality of motion compensation data accesses into a single bounding box for direct memory access data transfer. The method places the motion compensation data of a current macroblock into a current bounding box until placing the motion compensation data into the current bounding box causes the ratio of motion compensation data to bounding box data to fall below a predetermined memory utilization threshold.

3 Claims, 5 Drawing Sheets

STATISTICALLY CYCLE OPTIMIZED BOUNDING BOX FOR HIGH DEFINITION VIDEO DECODING

CLAIM OF PRIORITY

This application claims priority under 35 U.S.C. 119(e) (1) to U.S. Provisional Application No. 60/741,921 filed Dec. 2, 2005.

TECHNICAL FIELD OF THE INVENTION

The technical field of this invention is compressed video decoding.

BACKGROUND OF THE INVENTION

Motion estimation is the important temporal prediction tool to achieve high compression gain, but it comes with high I/O bandwidth requirement especially for HD video streams. Due to large I/O bandwidth and intense CPU processing requirements, High definition (HD) Video decoding solutions are difficult to realize as software programmable solutions. The recent digital signal processors (DSP) are able to handle CPU processing requirement by employing application specific CPU instructions, but the current software architectures designed for smaller than HD resolution are not able to exploit capabilities of recent DSPs fully. This is because of large hardware overhead due to inefficient usage of DMA bandwidth. For typical HD video stream HW overhead of up to 50% of CPU cycles is observed and scaling up CPU frequency does not improve HD video decoding performance considerably.

A bounding box algorithm is an effective way of reducing the HW overhead by combining several small transfers into single big transfer. A bounding box is hypothetical area which will be built for several blocks and typically be grown in size with every block. This process continues until it exhausts available memory for storing the bounding box. Because most of video decoding operations are macroblock based, the algorithm needs to be that the bounding box contains all the blocks in a macroblock. This can not be guaranteed with single bounding box and requires multiple bounding boxes.

SUMMARY OF THE INVENTION

Memory utilization optimized bounding box algorithm optimizes all the data paths for maximum memory utilization. The proposed solution optimizes memory utilization only for the most probable data path.

To get maximum memory utilization area whenever the current bounding box memory efficiency goes below a preset threshold, the current bounding box is closed and new bounding box is opened. All the blocks including current blocks fall in this newly opened bounding box until it too falls below the preset threshold. This design looks optimal from memory utilization point of view but it comes with cost of increase in CPU cycles. For typical HD resolution stream this translates to 46 MHz which is more than 10% of CPU processing required for entire decoding process. So bounding box increases DMA efficiency but that is not resulting in overall performance improvement because of huge increase in CPU cycle. To reduce the increase in CPU cycles, we propose an algorithm which exploits the high correlation among neighboring motion vectors. Memory optimized bounding box algorithm goes to several paths depending on whether the current block will be able to fit-in in currently open bounding box. If not then is there enough memory to open new bounding box. For each block bounding box algorithm will go through one of the possible paths. We change the bounding box algorithm to suit the path having maximum probability. The path having maximum probability will still have maximum memory utilization but we change the other paths to make them less computational intensive. This comes of course with cost of marginal decrease in memory utilization when algorithm does not go though most probable path. As the probability of most probable path is really high compared to other path due to high correlation among neighboring motion vectors, this does not result in significant degradation in memory utilization.

The proposed algorithm reduces CPU processing requirement for all the paths except for the most probable path. It makes, HW overhead reduction because of bounding box approach, result in significant improvement in overall performance too. This is possible because of significantly reduced CPU processing for bounding box building algorithm.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
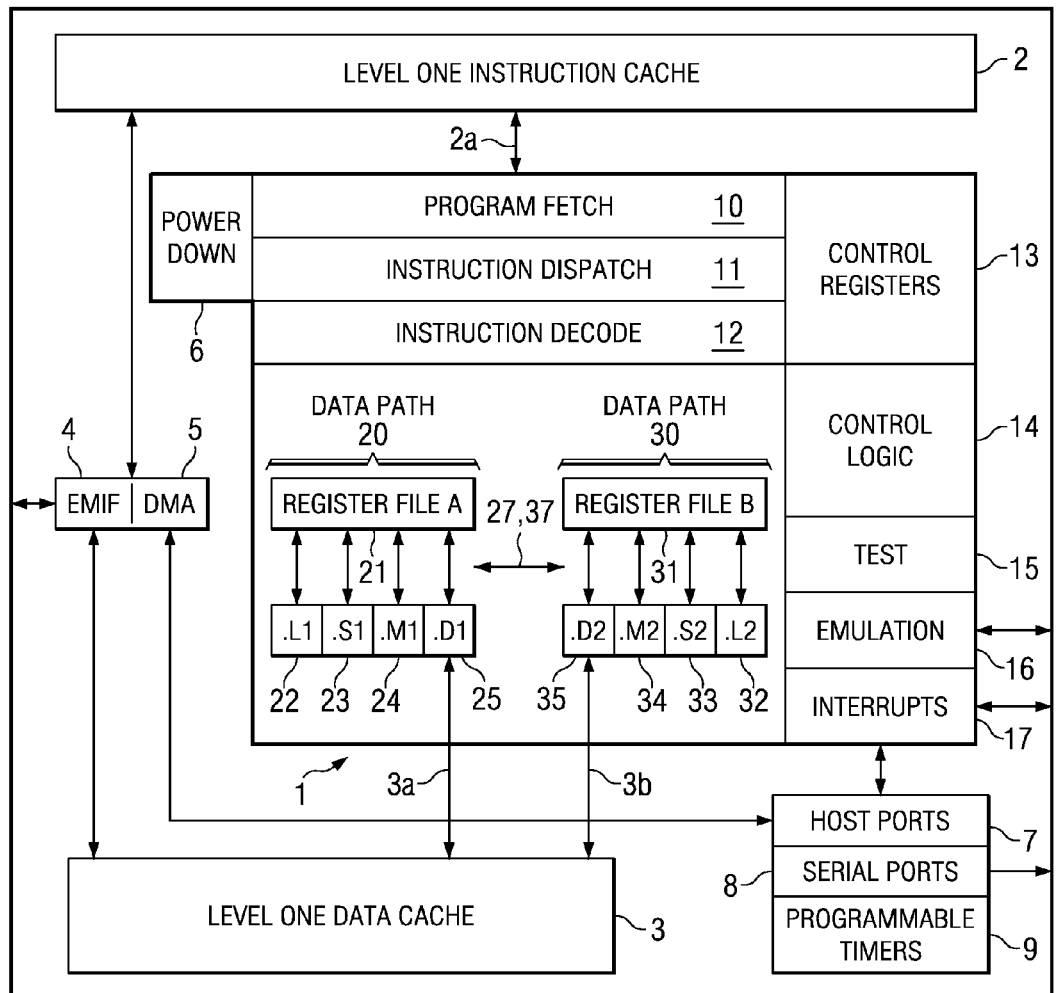
FIG. 1 illustrates details of a very long instruction word digital signal processor integrated circuit suitable for practicing this invention (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache 2. When off-chip memory is used, preferably these two spaces are unified into a single memory space via the external memory interface (EMIF) 4.

Level one data cache 3 may be internally accessed by central processing unit 1 via two internal ports $3a$ and $3b$. Each internal port $3a$ and $3b$ preferably has 32 bits of data and a 32-bit byte address reach. Level one instruction cache 2 may be internally accessed by central processing unit 1 via a single port $2a$. Port $2a$ of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. Central processing unit 1 includes control registers 13, control logic 14 and test logic 15 emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 2:
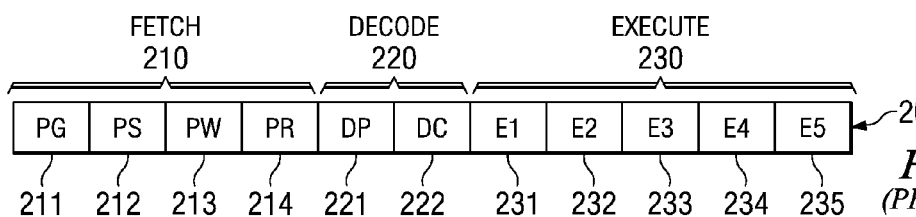
FIG. 2 illustrates the pipeline stages of the very long instruction word digital signal processor integrated circuit illustrated in FIG. 3 (prior art)

FIG. 2 illustrates the pipeline stages 200 of digital signal processor integrated circuit 100 (prior art). These pipeline stages are divided into three groups: fetch group 210; decode group 220; and execute group 230. All instructions in the instruction set flow through the fetch, decode, and execute stages of the pipeline. Fetch group 210 has four phases for all instructions, and decode group 220 has two phases for all instructions. Execute group 330 requires a varying number of phases depending on the type of instruction.

The fetch phases of the fetch group 210 are: Program address generate phase 211 (PG); Program address send phase 212 (PS); Program access ready wait stage 213 (PW); and Program fetch packet receive stage 214 (PR). Digital signal processor integrated circuit 100 uses a fetch packet (FP) of eight instructions. All eight of the instructions proceed through fetch group 210 together. During PG phase 211, the program address is generated in program fetch unit 10. During PS phase 212, this program address is sent to memory. During PW phase 213, the memory read occurs. Finally during PR phase 214, the fetch packet is received at CPU 1.

The decode phases of decode group 220 are: Instruction dispatch (DP) 221; and Instruction decode (DC) 222. During the DP phase 221, the fetch packets are split into execute packets. Execute packets consist of one or more instructions which are coded to execute in parallel. The relationship between a fetch packet and an execute packet will be explained below. During DP phase 222, the instructions in an execute packet are assigned to the appropriate functional units. Also during DC phase 222, the source registers, destination registers and associated paths are decoded for the execution of the instructions in the respective functional units.

The execute phases of the execute group 230 are: Execute 1 (E2) 231; Execute 2 (E2) 232; Execute 3 (E3) 233; Execute 4 (E4) 234; and Execute 5 (E5) 235. Different types of instructions require different numbers of these phases to complete. These phases of the pipeline play an important role in understanding the device state at CPU cycle boundaries.

During E1 phase 231, the conditions for the instructions are evaluated and operands are read for all instruction types. For load and store instructions, address generation is performed and address modifications are written to a register file. For branch instructions, branch fetch packet in PG phase 211 is affected. For all single-cycle instructions, the results are written to a register file. All single-cycle instructions complete during the El phase 231.

During the E2 phase 232, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 222.

During E3 phase 233, data memory accesses are performed. Any multiply instruction that saturates results sets the SAT bit in the control status register (CSR) if saturation occurs. Store instructions complete during the E3 phase 233.

During E4 phase 234, for load instructions, data is brought to the CPU boundary. For multiply extensions instructions, the results are written to a register file. Multiply extension instructions complete during the E4 phase 234.

During E5 phase 235 assuming no memory stall, load instructions write data into a register. Load instructions complete during the E5 phase 235.

Figure 3:
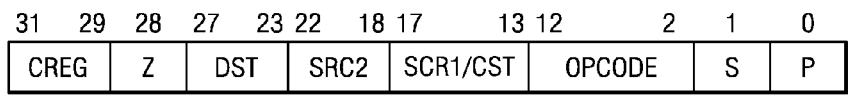
FIG. 3 illustrates the instruction syntax of the very long instruction word digital signal processor integrated circuit illustrated in FIG. 1 (prior art)

FIG. 3 illustrates an example of the instruction coding of instructions used by digital signal processor integrated circuit 100 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | X |

Note that "z" in the z bit column refers to the zero/not zero comparison selection noted above and "X" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 30 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 4:
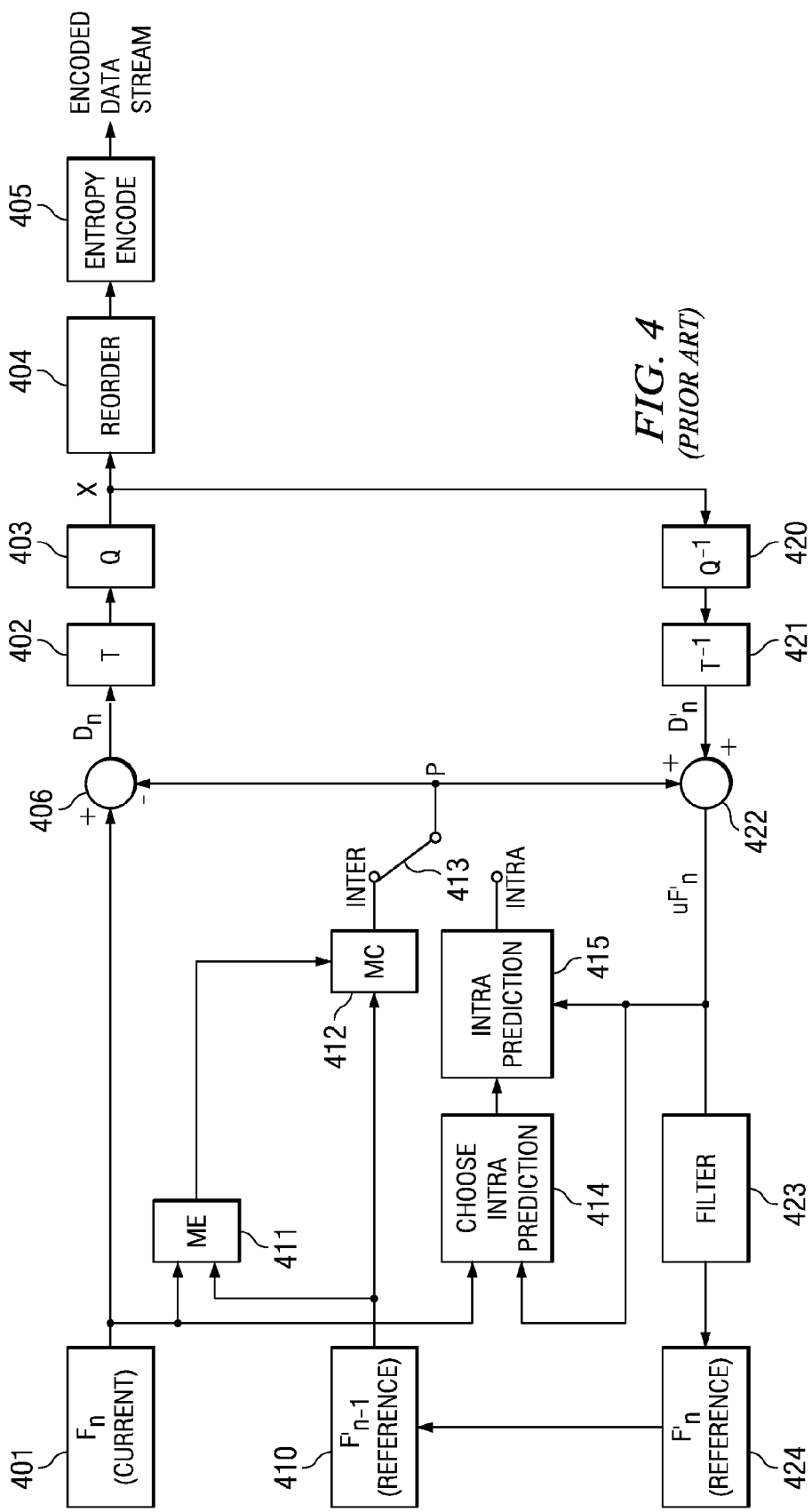
FIG. 4 illustrates an overview of the video encoding process of the prior art.

FIG. 4 illustrates the encoding process 400 of video encoding according to the prior art. Many video encoding standards use similar processes such as represented in FIG. 4. Encoding process 400 begins with the n th frame $F_n$ 401. Frequency transform block 402 transforms a macroblock of the pixel data into the spatial frequency domain. This typically involves a discrete cosine transform (DCT). This frequency domain data is quantized in quantization block 403. This quantization typically takes into account the range of data values for the current macroblock. Thus differing macroblocks may have differing quantizations. In accordance with the H.264 standard, in the base profile the macroblock data may be arbitrarily reordered via reorder block 404. As will be explained below, this reordering is reversed upon decoding. Other video encoding standards and the H.264 main profile transmit data for the macroblocks in strict raster scan order. The quantized data is encoded by entropy encoding block 405. Entropy encoding employs fewer bits to encode more frequently used symbols and more bits to encode less frequency used symbols. This process reduces the amount of encoded that must be transmitted and/or stored. The resulting entropy encoded data is the encoded data stream.

Video encoding standards typically permit two types of predictions. In inter-frame prediction, data is compared with data from the corresponding location of another frame. In intra-frame prediction, data is compared with data from another location in the same frame.

For inter prediction, data from n−1 th frame $F_{n-1}$ 410 and data from the current frame $F_n$ 401 supply motion estimation block 411. Motion estimation block 411 determines the positions and motion vectors of moving objects within the picture. This motion data is supplied to motion compensation block 412 along with data from frame $F_{n-1}$ 410. The resulting motion compensated frame data is selected by switch 413 for application to subtraction unit 406. Subtraction unit 406 subtracts the inter prediction data from switch 413 from the input frame data from current frame $F_n$ 401. Thus frequency transform block 402, quantization block 403, reorder block 404 and entropy encoding block 405 encode the differential data rather than the original frame data. Assuming there is relatively little change from frame to frame, this differential data has a smaller magnitude than the raw frame data. Thus this can be expressed in fewer bits contributing to data compression. This is true even if motion estimation block 411 and motion compensation block 412 find no moving objects to code. If the current frame $F_n$ and the prior frame $F_{n-1}$ are identical, the subtraction unit 406 will produce a string of zeros for data. This data string can be encoded using few bits.

The second type of prediction is intra prediction. Intra prediction predicts a macroblock of the current frame from another macroblock of that frame. Inverse quantization block 420 receives the quantized data from quantization block 403 and substantially recovers the original frequency domain data. Inverse frequency transform block 421 transforms the frequency domain data from inverse quantization block 420 back to the spatial domain. This spatial domain data supplies one input of addition unit 422, whose function will be further described. Encoding process 400 includes choose intra predication unit 414 to determine whether to implement intra prediction. Choose intra prediction unit 414 receives data from current frame $F_n$ 401 and the output of addition unit 422. Choose intra prediction unit 414 signals intra prediction intra predication unit 415, which also receives the output of addition unit 422. Switch 413 selects the intra prediction output for application to the subtraction input of subtraction units 406 and an addition input of addition unit 422. Intra prediction is based upon the recovered data from inverse quantization block 420 and inverse frequency transform block 421 in order to better match the processing at decoding. If the encoding used the original frame, there might be drift between these processes resulting in growing errors.

Encoding process 400 includes reconstruction of the frame based upon this recovered data. The output of addition unit 422 supplies deblock filter 423. Deblock filter 423 smoothes artifacts created by the block and macroblock nature of the encoding process. The result is reconstructed frame $F'_n$ 424.

As shown schematically in FIG. 4, this reconstructed frame $F'_n$ 424 becomes the next reference frame $F'_{n-1}$ 410.

Figure 5:
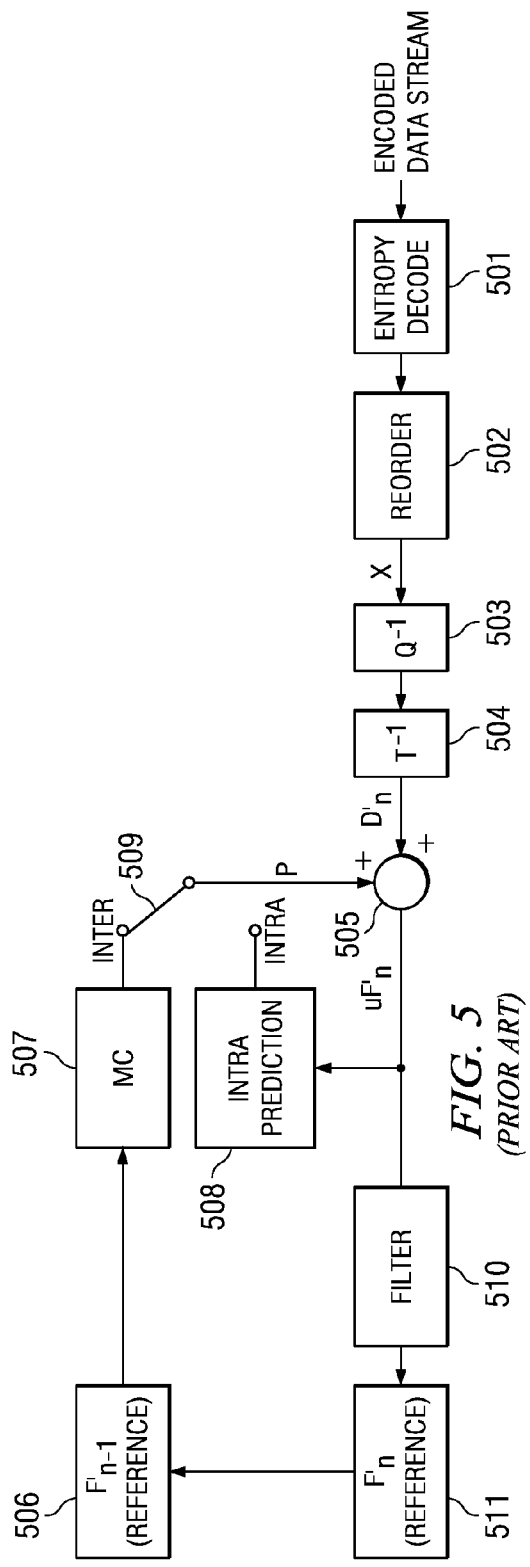
FIG. 5 illustrates an overview of the video decoding process of the prior art.

FIG. 5 illustrates the corresponding decoding process 500. Entropy decode unit 501 receives the encoded data stream. Entropy decode unit 501 recovers the symbols from the entropy encoding of entropy encoding unit 405. Reorder unit 502 assembles the macroblocks in raster scan order reversing the reordering of reorder unit 404. Inverse quantization block 503 receives the quantized data from reorder unit 502 and substantially recovers the original frequency domain data. Inverse frequency transform block 504 transforms the frequency domain data from inverse quantization block 503 back to the spatial domain. This spatial domain data supplies one input of addition unit 505. The other input of addition input 505 comes from switch 509. In inter mode switch 509 selects the output of motion compensation unit 507. Motion compensation unit 507 receives the reference frame $F'_{n-1}$ 506 and applies the motion compensation computed by motion compensation unit 412 and transmitted in the encoded data stream.

Switch 509 may also select intra prediction. The intra prediction is signaled in the encoded data stream. If this is selected, intra prediction unit 508 forms the predicted data from the output of adder 505 and then applies the intra prediction computed by intra prediction block 415 of the encoding process 400. Addition unit 505 recovers the predicted frame.

The output of addition unit 505 supplies the input of deblock filter 510. Deblock filter 510 smoothes artifacts created by the block and macroblock nature of the encoding process. The result is reconstructed frame $F'_n$ 511. As shown schematically in FIG. 5, this reconstructed frame $F_n$ 511 becomes the next reference frame $F_{n-1}$ 506.

The deblocking filtering of deblock filter 423 and deblock 510 must be the same. This enables the decoding process to accurately reflect the input frame $F_n$ 401 without error drift. The H.264 standard has a specific, very detailed decision matrix and corresponding filter operations for this process. The standard deblock filtering is applied to every macroblock in raster scan order. This deblock filtering smoothes artifacts created by the block and macroblock nature of the encoding. The filtered macroblock is used as the reference frame in predicted frames in both encoding and decoding. The encoding and decoding apply the identical processing the reconstructed frame to reduce the residual error after prediction.

Software programmable solutions to High Definition (HD) video decoding are difficult to achieve due to large I/O bandwidth and intense CPU processing requirements. Recent digital signal processors (DSPs) are able to handle this CPU processing requirement by employing application specific CPU instructions tailored to video decoding. In the past programs designed for smaller than HD resolution were not able to fully exploit the capabilities of such a DSP due to inefficient usage of direct memory access (DMA) bandwidth.

This invention is a software algorithm for real time MPEG2 HD Decoding. Data structures play an important role in designing the CPU cycle and I/O software solution. Programmable video decoding is increasingly important in a variety of emerging end equipment applications. Programmable video decoding reduces time to market and increases product lifetime in an environment of evolving standards. MPEG-2 video decoding is a key component in broadband multimedia HD applications in additional to supporting key new algorithms such as MPEG-4 and H264. The demand for true HD decoding for both 1080i (1080 lines by 1920 pixels at 60 fields per second interlace scan) and 720 p, (720 lines by 1280 pixels at 60 frames per second progressive scan) in set top box and other embedded applications is increasing.

A typical 720p stream has a worst case data transfer requirement of around 300 to 400 Mbytes per second. This creates a severe I/O bandwidth problem. Motion compensation in bidirectional predicted frames (B-frames) requires a large number of small transfers of motion compensation (MC) blocks of up to 432,000 per second. Because of limited DMA submission buffer queue length the maximum number of MB in queue at one time may be as low as 2 or 3. This greatly increases the number of CPU cycles per MB because of high program/data cache misses. On a DSP such as described in conjunction with FIGS. 1 to 3, the typical overhead due to cache and DMA is as high as 50 to 55% of core cycles. This requires around 600 core cycles per 8 by 8 block to meet the HD real time decoding constrain of about 600 MHz decoding. This large number of small transfers may create a problem for a digital signal processor such as described above in conjunction with FIGS. 1 to 3. While the DSP may have adequate DMA bandwidth the DMA submission buffer queue length may be limited. In an environment requiring many small data transfers this limited submission buffer queue length can cause high submissions stalls. Such stalls make DMA transfers wait. Thus the data transfers, which previously were hidden behind CPU processing of lower resolution video decoding, come to the foreground in HD resolution video decoding. Such stalls cause a low DMA transfer efficiency. Because of these challenges, there is currently no software programmable HD decoder.

A commonly used prior art technique to improve program cache performance processing of N macro blocks (MB) includes chunk data transfer. A chunk is an area of data including more than one MB. The basic decoding process is divided mainly in two loops: a variable length decoding (VLD) loop; and a motion compensation (MC) loop. The VLD loop calculates reference address to fetch data and triggers DMA transfer requests for N MB. The MC loop consumes reference data triggered in the VLD loop, motion compensates the frame and writes reconstructed output for the N MB. In MPEG-2 the maximum number of motion vectors (MV) per MB is 4, including: forward; backward; first; and second. In the worst case a MB needs 4*3=12 triggers including four each for luminance (Y), blue chrominance (Cb) and red chrominance (Cr). The example DSP described in conjunction with FIGS. 1 to 3 has buffer queue length 14, thus one MB could nearly fill the buffer. Thus for N MBs in the worst case the DSP faces the problem of buffer queue being full from the second MB. This causes a foreground submission stall. The center processing unit (CPU) must wait (halt) to request a data transfer when there is no submission space left in the DMA buffer. Release of space in the buffer queue occurs upon completion of pending transfer. Some DSPs of the family described above support supports linking of multiple DMA transfer requests. All such linked transfer request can be initiated with single trigger without further CPU intervention. This feature eliminates submission stall but introduces another problem. Each such linked DMA transfer request requires one parameter memory entry. Limited parameter memory entries restricts N to just 2 or 3.

In the prior art approach DMA transfers are hidden behind VLD and inverse Discrete Cosine Transform (IDCT) operations of current chunk of N MBs. This is possible because motion compensation is done only after completion of VLD and IDCT of the current chunk of N MBs. The MC block needs all the data transfer triggered by the first loop. Because motion compensation is done immediately after the VLD loop completes, all the transfers triggered may not have been completed. The problem worsens when all the MBs in the VCL loop are of SKIP_MB type. In this case there will not be any VLD, IDCT block to hide the DMA transfers. These problems cause significant submission stalls and transfer completion waits.

The CPU cycles needed for triggering DMA transfers is not small for such a huge number of transfers. The problem worsens with HD streams. For a 720 p 60 frames per second HD TV stream, the average number of transfer for the prior art scheme is around 10,800 transfers per frame. This translates to 32 M cycles per second assuming 50 cycles per submission. The transfer submission not must write to DMA transfer request registers but fetch data from structures/stacks to be written to the DMA transfer request registers. Thus HD stream total data transfer overhead is around 55% of the CPU cycles. This calls for a different approach for HD video decoding.

This invention employs a bounding box (bbox) technique to reduce the number of DMA data transfers needed to fetch reference MBs. This invention uses a double buffer technique to get maximum I/O bandwidth utilization. One buffer is filled with new data while the CPU operates on data in the other buffer. The goal is to reduce submission stalls to zero and to reduce DMA transfer completion waits to negligible amounts. This invention enables an increase in N limited only by available on-chip memory. This increase of N also improves program and data cache performance because data in the cache will be used for more times before replacement. If both the VLD and MC loops can be individually fit in the program cache, a large N makes these loops replace each other less often. When placing the buffer in data cache, for a large N the cache will be accessed sequentially for several blocks before it is replaced by another buffer. This yields better cache performance than alternatively accessing IDCT_buf and reconstructed_op_buf.

Figure 6:
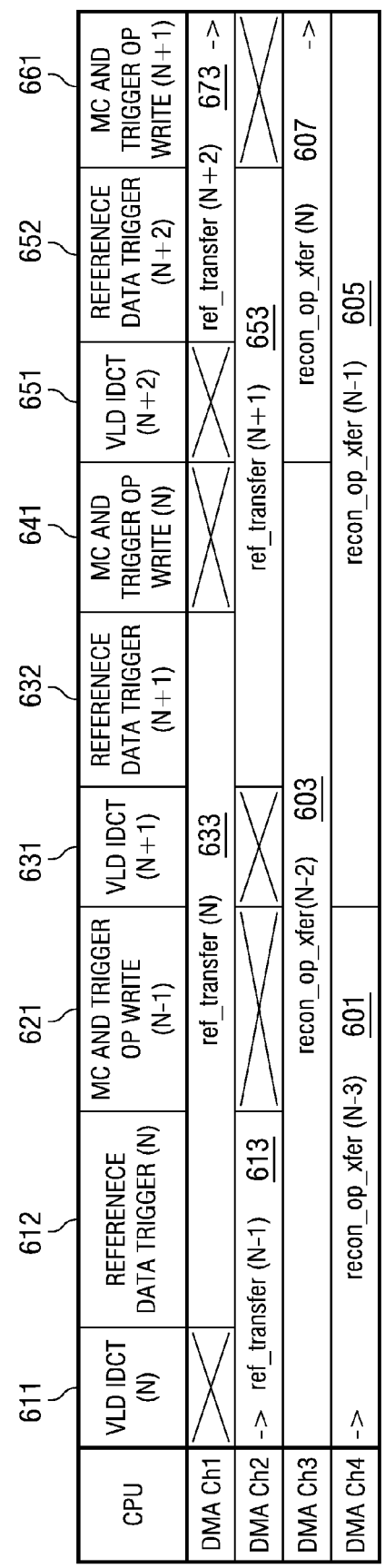
FIG. 6 illustrates a time line of operations of the CPU and various DMA channels in an example decoder of this invention.

FIG. 6 illustrates this graphically. The left most column indicates the hardware executing the processing shown in the row. The first row represents processing on the CPU. The second to fifth rows are corresponding DMA channels. The decoding process is divided mainly in two loops: a VLD loop; and a MC loop. As shown in FIG. 6 data processing proceeds in blocks of data called chunks. The size of these chunks is determined based upon processing capacity of the DSP and the memory capacity including cache size.

In FIG. 6, VLD IDCT(N) 611 is the first loop and includes decoding the macroblock mode, decoding the motion vector (MVD), variable length decoding (VLD), inverse zigzag, inverse quantization and inverse discrete cosine transform (IDCT) for all macroblocks in chunk number N. VLD IDCT (N+1) 631 and VLD IDCT(N+2) 651 are similar for respective later chunk numbers N+1 and N+2.

Reference data trigger(N) 612 is the trigger to fetch data for the macroblocks in the first loop for the chunk N. Reference data trigger(N+1) 632 and reference data trigger(N+2) 652 are similar for respective later chunk numbers N+1 and N+2.

MC and trigger op write(N−1) 621 is the second loop and includes half pixel interpolation and motion compensation of the macroblocks in chunk N−1. This block stores the reconstructed output in reconstructed_op_buf. In case of Intra coded frames this block includes adding a DC bias of 128 to the IDCT output and saturation. MC and trigger op write(N) 641 and MC and trigger op write(N+1) 661 are similar for respective later chunk numbers N and N+1.

Recon_op_xfer(N) block 607 is the data transfer for writing reconstructed output generated in second loop from reconstructed_op_buf to output buffers. Recon_op_xfer (N−1) block 605, recon_op_xfer (N−2) block 603 and recon_op_xfer (N−3) block 601 are similar for respective previous chunks N−1, N−1 and N−2.

The first block VLD IDCT(N) 611 prepares residual data and determines the addresses of reference data because this block includes MVD. The next block ref data trigger(N) 612 begins the fetch of this reference data for the next process. According to this invention, this uses a bounding box technique which will be described in more detail below. All the triggers for data transfer of this chunk happen on the same DMA channel. Next, is block 621 including motion compensation (MC) of the previous chunk (N−1) and writing to the reconstructed_op_buf. The data for this process was already fetched. This cycle repeats for next set of chunks.

FIG. 6 illustrates that reference data transfer for chunk N 633 is hidden behind: the CPU cycles triggering data transfer for the current (N) chunk 612, which may be significant if there are multiple transfers; motion compensation and writes 621 for previous chunk (N−1); variable length decoding and inverse discrete cosine transform 631 for the next chunk (N+1); and the CPU cycles triggering data transfer for the next (N+1) chunk 632. There is a DMA wait between the two loops to make sure reference data needed for motion compensation is available. The IDCT block is floating and can go in either of the two loops to balance out processing loads without changing functionalities. As shown in FIG. 6, these reference data transfers alternate between DMA channels 1 and 2.

This attempts to hide the DMA transfers of the macro blocks for motions compensation behind other processes. Hiding DMA transfers behind blocks of different chunks makes it possible to average out allowable DMA transfer time. Another is DMA transfers are hidden by combined time Tref_hid(N)=MC (N−1)+VLD (N+1)+IDCT (N+1). This higher the value of Tref_hid provides a greater chance of hiding the DMA transfers. For an example, if a B frame has many macroblocks encoded as SKIP_MB, VLD IDCT (N) will not consume significant cycles. However the motion compensation can even out the number of cycles. At the other extreme, in an intra encoded frame blocks the motion compensation will take an insignificant number of cycles but the VLD IDCT (N) block will be significant because of high number bits needed for the intra frame. Thus there is greater chance of having a significant Tref_hid value to hide the DMA transfers for typical cases and these extreme cases.

The writing of reconstructed data to output buffers recon_op_xfr (N) 607 is hidden behind many processing block involving future chunks (N+1, N+2, N+3). This makes recon_op_xfer (N) completely hidden behind CPU cycles. This is possible because of double buffering of reconstructed_op_buf.

This application will next describe the bounding box technique of this invention. The bounding box technique exploits the fact that there is high correlation among neighboring motion vectors in most natural video sequences. This permits great reduction in I/O bandwidth. Instead of having many small transfers, one for each macro block, these are gathered into a single big transfer which fetches data for plural motion compensation blocks.

Figure 7:
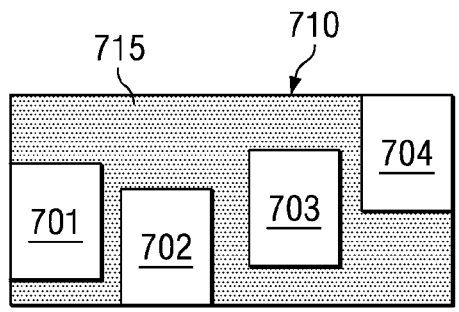
FIG. 7 illustrates a first example including one bounding box.

FIG. 7 illustrates this gathering process. FIG. 7 illustrates plural motion compensation reference blocks ref_block_1 701, ref_block_2 702, ref_block_3 703 and ref_block_4 704. Bounding box 710 is a hypothetical area having the minimum rectangular area to encompass all the reference blocks in single transfer. This has the advantage of cutting down the number of DMA transfers to transfer all the reference data. In this example each individual data transfer of each reference block requires 4 DMA transfers. The whole bounding box 710 can be transferred in one DMA transfer.

Figure 8:
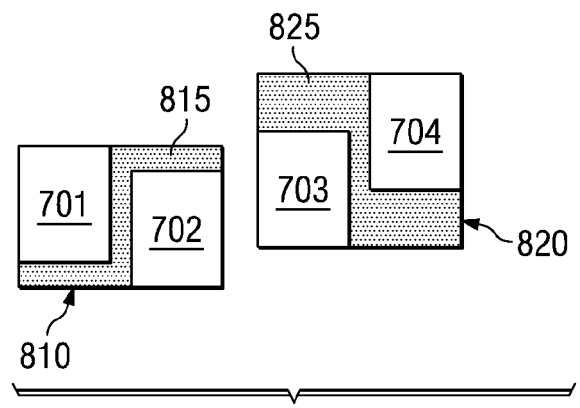
FIG. 8 illustrates a second example including two bounding boxes.

This invention uses two design parameters defined below. MAX_NMBS is the maximum number of macroblocks in a single chunk. MAX_BBOX_SIZE is the maximum bounding box area to store reference data for single chunk. These design parameters are fixed using a little bit of engineering. There is no way to guarantee that MAX_NMBS macroblocks will be able to fit in MAX_BBOX_SIZE area. The MPEG2 encoder doesn't limit the distance between two neighboring motion vectors. This technique may poorly utilize bounding box area. Patterned area 715 of bounding box 710 shows area between reference blocks 701, 702, 703 and 704 that is unnecessary data transferred to avoid multiple DMA transfers. This can be overcome by fetching data in multiple transfers by having more than one bounding boxes. FIG. 8 illustrates enclosing reference blocks ref_block_1 701 and ref_block_2 702 in first bounding box 810 and enclosing reference blocks ref_block_703 and ref_block_4 704 in second bounding box 820. As shown in FIG. 8 moving the data of the two bounding boxes 810 and 820 still reduces the number of DMA transfers from that required for DMA transfers for individual blocks. As shown from the comparison of FIGS. 7 and 8, the multiple bounding box case illustrated in FIG. 8 transfers less unnecessary data (the sum of patterned areas 815 and 825) than the single bounding box case illustrated in FIG. 7 (patterned area 715). This reduction in unnecessary data transfer comes at the expense of addition overhead for more DMA transfers.

This invention defines a bounding box efficiency measure. Before deciding if any macroblock goes below preset threshold for a bounding box, this invention starts constructing the next bounding box. In the example illustrated in FIG. 8, the technique determines if bounding box 710 should be expanded to include ref_block_3 703. FIG. 7 illustrates an example where the bounding box is expanded to include both ref_block_3 703 and ref_block_4 704. FIG. 8 illustrates an example where a new bounding box 820 is created to encompass ref_block_3 703 and ref_block_4 704. Thus upon consideration of ref_block_3 703, the technique needs to consider which of these examples is best in the particular hardware and software environment of that decoding application.

This invention attempts to restrict the number of bounding boxes per chunk. The memory required for storing the bounding box information for all the bounding boxes in the chunk is directly proportional number of bounding boxes in the chunk. This is important consideration for any limited memory system. More bounding boxes will result in a greater number of DMA transfers. This reduces the improvement achievable using the bounding box technique. This technique uses another design parameter called MAX_NUM_BBOXES.

Conceptually this seems simple but there are problems for very large resolution video sequence like HD. When decoding HD streams building a bounding box and calculating reference address from start of the bounding box are not insignificant in CPU cycle consumption. For a 720 line progressive scan (720p) at 60 frames per second HD stream there will be 3600 macroblocks per frame with each macroblock having up to 4 motion vectors. Thus there could be 864,000 motion vectors per second. Budgeting as little as 100 additional CPU cycles for deciding in which bounding box a motion compensation block will fall and for calculation of reference data address from the start of the bounding box yields 86.4 MHz bounding box overhead. This overhead may wipe out any DMA bandwidth saving. Thus there is a need for a highly efficient data structure for the bounding box and a cycle optimized application program interface (API).

The preferred embodiment of this invention uses the following data structure for storing bounding box information.

Data Structure 1

```
typedef struct __bbox__obj
{
    unsigned int top__left__Y, bottom__right__Y;
    unsigned int top__left__UV, bottom__right__UV;
    unsigned char *pRefY, *pRefU, *pRefV;
    unsigned short area;
    short bbox__y__width;
    short bbox__uv__width;
} bbox__obj;
```

A bounding box is 2-D rectangular shape entity, thus the coordinates of the top-left and bottom-right corners completely describe its position. The first two parameters are for a Luma bounding box and next two are for a combined Chroma bounding box. This preferred embodiment uses a single bounding box for chrominance Cb and Cr because they have exactly the same motion vector. The next three pointers are the starting physical addresses in the reference frame for respective Y, Cb and Cr data. The area is the area of the Luma bounding box. The next two parameters are the width of the respective Luma bounding box and the combined Chroma bounding box. These last three parameters are derived variables from other structure members. However, they are used in more than one place and are calculated once and stored for further reference.

There may be multiple macroblocks in a single chunk and there may be multiple bounding boxes in a single chunk. In case of B frame, at least one bounding box is needed for each direction. The preferred embodiment of this invention uses the following chunk level data structure.

Data Structure 2

```
typedef struct __chunk__parm__obj
{
    unsigned char bbox__id__L0;
    unsigned char bbox__id__L1;
    unsigned char coded__mbs;
    unsigned char *perr__ref__buffer[2];
    unsigned char num__blocks[2];
    short* p error;
} chunk__parm__obj;
```

The variable bbox_id_L0 indicates the current bounding box ID for the forward direction. This variable bbox_id has range from 0 to MAX_NUM_BBOXES−1. A non-zero value of bbox_id L1 indicates bbox_id_L0 number of bounding boxes are closed and currently (bbox_id_L0+1)st is opened. In the example illustrated in FIG. 8, while processing ref_block_4 704 bbox_id_L1 will be 1, which indicates 1 bounding box is closed (810) and a second bounding box (820) is currently open.

The variable bbox_id_L1 indicates the current bounding box ID for the backward direction and has a similar range and purpose as bbox_id_L0. For a bidirectional frame (B frame) two bounding boxes must be opened at a time. This means a maximum of two bounding boxes will be active.

The variable coded_mbs indicates how many blocks are coded in the current chunk. This is needed because the IDCT output and reference data fetched after building boxes are stored in tandem for optimal memory utilization. After completing the first loop the IDCT output would have occupied coded_mbs*IDCT_op_size bytes of memory area. The reference data needs to be stored after this. This would be used in bbox calculation function also to decide whether current bounding box can fit in a given memory area.

Figure 9:
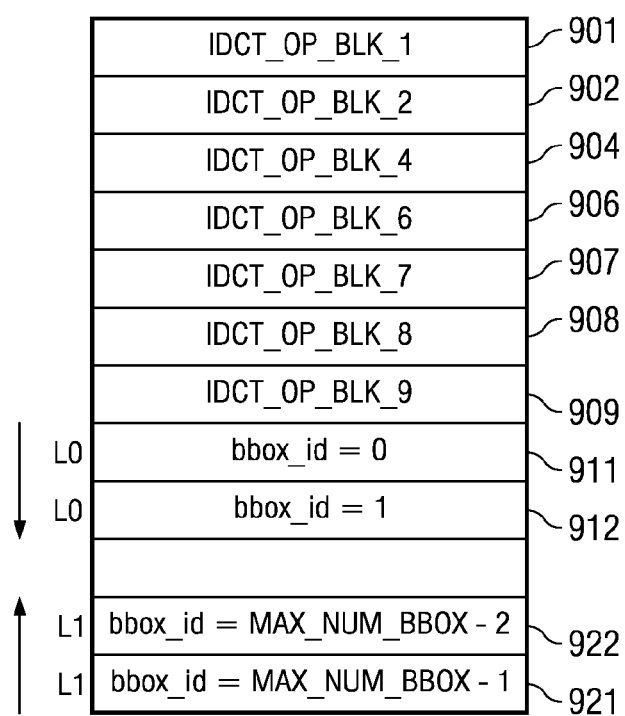
FIG. 9 illustrates an example memory allocation when practicing an embodiment of this invention.

FIG. 9 illustrates an example of this bounding box coding. The top part of memory 901, 902, 904, 906, 907, 908 and 909 stores respective IDCT outputs IDCT_OP_BLK_1, IDCT_OP_BLK_2, IDCT_OP_BLK_4, IDCT_OP_BLK_6, IDCT_OP_BLK_7, IDCT_OP_BLK_8 and IDCT_OP_BLK_9. In the example of FIG. 9, data for IDCT blocks 3 and 5 is omitted because these are SKIP_MB type macroblocks. Thus VLD and IDCT operations are not required. The bottom part of memory stores reference data such as shown in data structure 2 for forward and backward bounding boxes. The example of FIG. 9 includes two forward bounding boxes 911 and 912 and two backward bounding boxes 921 and 922. FIG. 9 illustrates that forward bounding boxes 911 and 912 receive IDs allocated from 0 incrementing toward MAX_NUM_BBOX-1 and are stored in the top of the memory toward the bottom. The backward bounding boxes 921 and 922 receive IDs allocated from MAX_NUM_BBOX -1 decrementing toward 0. These forward and backward bounding boxes will not cross because the memory allocated corresponds to MAX_NUM_BBOX the maximum number of bounding boxes in the chunk.

The variable perr_ref_buf[2] is the is top of the memory area illustrated in FIG. 9. This variable requires two elements because of double buffering.

The variable num_blocks[2] indicates the number of macroblocks in the current chunk. Two elements are required because of double buffering.

The variable perror is the address where the VLD and IDCT output will be stored for current macroblock.

Figure 10:
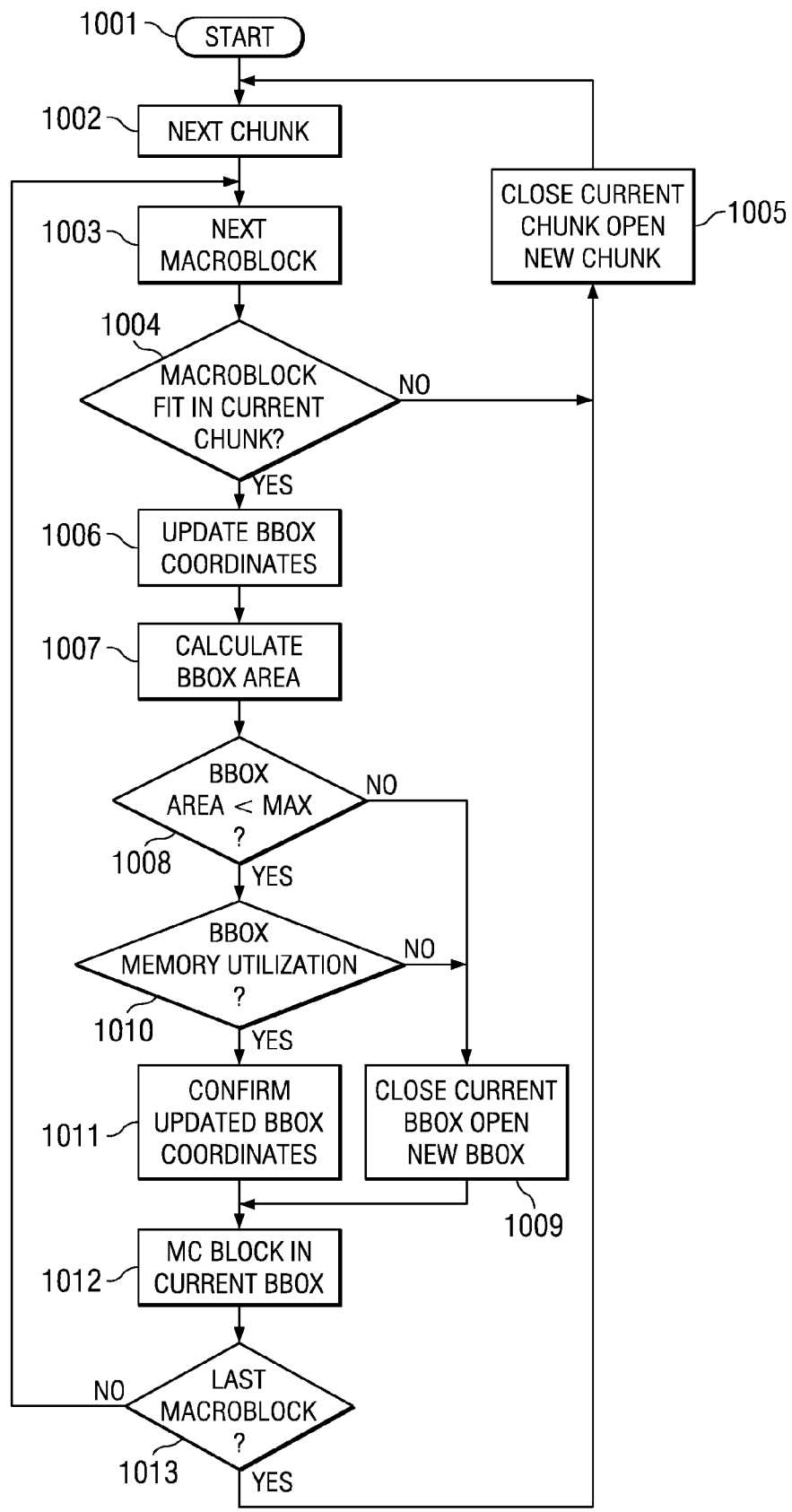
FIG. 10 illustrates a flow chart of an example of practicing this invention.

FIG. 10 illustrates the method of this invention in flow chart form. The method starts at start block 1001. The method considers the next chunk (processing block 1002). In the case of initial operation, this next chunk is the first chunk in a frame. The method considers the next macroblock in processing block 1003. This next macroblock would be the first macroblock for initial operation of the current chunk.

Decision block 1004 tests to determine if the current macroblock will fit in the current chunk. This determination is made by comparing the current macroblock count with MAX_NMBS. If the current macroblock will not fit in the current chunk (No at decision block 1004), then the method closes the current chunk and opens a new chunk (processing block 1005) and returns to processing block 1002 for the next chunk. Note in this case the next macroblock considered in the next execution of processing block 1003 is the macroblock that triggered the change to the next chunk.

The method must then determine if the current macroblock should be included in the current bounding box. This includes calculating the updated bounding box coordinates assuming the current macroblock will fit within the current bounding box (processing block 1006). The coordinates for each motion block need to be stored for constructing the bounding box. For maximum DMA efficiency on the example DSP illustrated in FIGS. 1 to 3, the destination address should be aligned on double-word (8-byte) boundaries. There is no guarantee that the reference data will start from any byte boundary, thus source address needs to be aligned. It is known to align data manually, which will fetch few more bytes than required. There are several ways to achieve this, the simplest way with minimum redundant fetch is explained below with an example of 17 by 17 pixels transfer.

A 17 by 17 transfer will be needed when motion compensation block has a size of 16 by 16 pixels. Due to half-pel interpolation 1 extra pixel is fetched from the right and the bottom. To make any transfer double word aligned the minimum needed transfer 24 by 17 with whatever way above is implemented. A 24 by 17 transfer aligned at nearest left double-word boundary will always include the required 17 by 17. The motion compensation block is stored in a block size of 24 by 17 and recalled on an aligned source address. This may be achieved using the following pseudo code.

```
top_left_part_YY=l_smb_coord->top_left_YY&~7
bot_right_part_YY=top_left_part_YY+l_smb_coord->width_Y
size_part=l_smb_coord->size;    //aligned size of each part of
                                  different dimension//
```

The method next checks to determine if the motion compensation blocks of the current macroblock can fit in the currently opened bounding box. The method first calculates the bounding box coordinates assuming current motion compensation block can fit in the current bounding box (processing block 1006). The example DSP illustrated in FIGS. 1 to 3 can do this updating with a dual minimum instruction MIN2 and a dual maximum instruction MAX2. The minimum operation MIN2 selects the minimum of two input operands minimum operation on packed, signed 16-bit values placing the result in a corresponding location as packed 16-bit values in the destination. The maximum operation MAX2 similarly selects the maximum of two input operands for packed 16-bit data. Thus this code can perform the update.

TL_SuperWindowY=min2 (TL_SuperWindowY, top_left_part_YY);
BR_SuperWindowY=max2 (BR_SuperWindowY, bottom_right_part_YY);

Where: TL_SuperWindowY is the top-left coordinates of the current bounding box; BR_SuperWindowY is the bottom-right coordinates of the current bounding box; top_left_part_YY is the top-left coordinates of the current motion compensation block; and bottom_right_part_YY is the bottom-right coordinates of the motion compensation block. Those skilled in the art would select other code to perform this function if the MIN2 and MAX2 instructions are not available.

After updating the bounding box coordinates, the method computes the area of the new bounding box (processing block 1007). Decision block 1008 compares this area with MAX_BBOX_SIZE. If the updated bounding box coordinates does not cause the bounding box to exceed MAX_BBOX_SIZE (Yes at decision block 1008), then the current macroblock will fit into the current bounding box.

If the updated bounding box coordinates cause the bounding box to exceed MAX_BBOX_SIZE (No at decision block 1008), then the current macroblock cannot fit into the current bounding box. In this event the method closes the current bounding box and opens another bounding box (processing block 1009). The current macroblock and its corresponding motion vectors are allocated to the new current bounding box (processing block 1012).

Decision block 1010 determines if adding the current macroblock to the current bounding box causes the memory utilization to fall below a predetermined threshold selected based upon memory utilization as illustrated in FIGS. 7 and 8. This memory utilization test fails if adding the current macroblock to the current bounding box causes the ratio of motion compensation data to bounding box data to exceed a predetermined threshold. If the memory utilization test fails (No at decision block 1010), then the current bounding box is closed and a new bounding box is opened in processing block 1009.

The current macroblock and its corresponding motion vectors are allocated to the new current bounding box (processing block 1012).

If the memory utilization passes (Yes at decision block 1010), then the dimensions of the current bounding box are confirmed (processing block 1011). This assigns the new bounding box the coordinates calculated in processing block 1006. The current macroblock with its corresponding motion vectors is allocated to the current bounding box (processing block 1012).

There are certain implementations aspects need to be considered for fully functional implementation. There are several scenarios under which the method needs to either open new bounding box or break current chunk. Even in case where it is decided not to keep current motion compensation block in the current bounding box, the coordinates of current bounding box need to be updated to determine the area needed for the bounding box. The method may need to revert back to old bounding box coordinates. These operations are costly as any load (LD), store (ST) operations on the example DSP of FIGS. 1 to 3 take 5 cycles. This method requires two coordinates for Luma, two for Chroma and one variable for bounding box area. In case of a B frame operations require double these numbers, one for each direction.

Therefore this method must take care about bounding box coordinates. This application proposes two alternative embodiments for performing this computation: memory utilization optimized; and CPU cycle optimized. The memory utilization optimized operation is noted in the pseudo code of Listing 1. The CPU cycle optimized operation is noted in the pseudo code of Listing 2.

Memory utilization optimized bbox_calc ( ) function

---
Listing 1
---

```
bbox_obj      cur_bbox_coord
bbox_obj      register cur_bbox_coord_backup
bbox_obj      register cur_bbox_coord_local
cur_bbox_coord_local = structure_to_register(cur_bbox_coord)
cur_bbox_coord_MB_backup = cur_bbox_coord_local
bbox_id = bbox_id_MB bk;
FOR INDEX = 0 nun_mc_bk-1
      cur_bbox_coord_blk_backup = cur_bbox_coord_local
      cur_bbox_coord_local = bbox_update
            (cur_bbox_coord_local, current_part)
      IF    (All bboxes in the current chunk can fit in the
            available memory)
            find memory area utilization
            IF    (utilization < utilization_threshold)
                  Keep current MC block in current bbox
            ELSE
TI-61374                        12/4/06
                  cur_bbox_coord =
                        register_to_structure(cur_bbox_coord_blk
                  Close current bbox.
                  bbox_id++
                  Open new bounding box.
                  cur_bbox_coord_local = bbox_update
                        (current_part)
                  IF    (All bboxes in the current chunk can fit
                        in the available memory)
                        Keep current MC block in current bbox
                  ELSE
                        status=FAIL
                        break out of FOR loop
                  ENDIF
            ENDIF
      ELSE
            status = FAIL
            break out of for loop
```

---
Listing 1
---

```
ENDFOR
IF (status != FAIL)
      cur_bbox_coord = register_to_structure
            (cur_bbox_coord_local)
ELSE
      cur_bbox_coord = register_to_structure
            (cur_bbox_coord_MB_backup)
      bbox_id = bbox_id_MB_blk
ENDIF
```

The memory utilization optimized pseudo code given begins with structure declarations. Note that structures declared with register keyword will go actually into CPU registers such as register file A 21 or register file B 31 illustrated in FIG. 1. Because finite registers are available to the CPU, the compiler usually puts structures into the stack. Thus any member dereferencing of the structure would take 5 cycles. The memory utilization optimized pseudo code avoids this by storing copies in CPU registers for any structure which is de-referenced multiple times. In the declaration, cur_bbox_coord_local and cur_bbox_coord_backup are this type registers because they would get used frequently. The structure_to_register and register_to_structure functions are used to read/write from structures and store/load into the CPU registers.

This design is the best memory utilization. Statistically there is more chance that both IF conditions (IF all bounding boxes in the current chunk can fit in the available memory and IF utilization<utilization_threshold) will be true due to high correlation among neighboring motion vectors if a sufficiently large memory area is allocated for storing reference data. So most of the motion compensation blocks will have redundant operations for backing up coordinates for current bounding box and bounding box area.

---
Listing 2
---

```
CPU cycle optimized bbox_calc( ) function
bbox_obj      cur_bbox_coord
bbox_obj      register cur_bbox_coord_local
bbox_id_local = bbox_id;
cur_bbox_coord_local = structure_to_register(cur_bbox_coord)
FOR INDEX = 0: nun_mc_blk-1
      cur_bbox_coord_local = bbox_update(cur_bbox_mrd_local,
            current_part)
      IF    (utilization < utilization_threshold)
            IF    (All bboxes in the current chunk can fit in
                  the available memory)
                  status = FAIL
                  break out of for loop
            ENDIF
            Keep current MC block in current bbox
      ELSE
            Close current bbox.
            cur_bbox_coord = cur_bbox_cood_local
TI-61374                        12/4/06
            bbox_id++
            Open new bounding box.
            IF    (All bboxes in the current chunk can fit in
                  the available memory)
                  status = FAIL
                  break out of for loop
            ELSE
                  Keep current MC block in current bbox
            ENDIF
      ENDIF
      cur_bbox_coord =
            register_to_structure_bbox_coord_local)
```

```
                        Listing 2

ENDFOR
    IF       (status != FAIL)
             bbox_id = bbox_id_local
ENDIF
```

The CPU cycles optimized pseudo code of Listing 2 uses a design tweaked to favor of a high probability path that all motion compensation blocks fall into the currently opened bounding box. Backup operations of the memory utilization optimized approach use many cycles. This is significant compared to overall number of cycle for bounding box calculation when number of motion compensation blocks per macroblock is low. This requires a marginally reduced memory utilization efficiency. The primary difference is that the CPU cycle optimized pseudo code reverses the order of the major IF operations relative to the memory utilization optimized pseudo code.

Table 2 shows a comparison between these two alternatives. Table 2 shows the number of several types of copy operations for the two alternatives verses the number of motion compensation data blocks per macroblock. Table 2 shows that as the number of variables grow, there is a greater chance that they are allocated onto a stack requiring data accesses. The pseudo code of Listings 1 and 2 are applicable only for P frames. As previously noted, for B frame the complexity will be almost double so there is high chance that all variables pertaining to bounding box will be allocated onto a stack. Thus the cycle optimized alternative of Listing 2 reduces the structure copy operations in single MC block per MB case by about half and in a 2 MC per MB by about 40%. In MPEG-2 the maximum number of MC blocks per MB is restricted to 2 for each direction. Thus the memory optimized pseudo code of Listing 1 will outperform the cycle optimized pseudo code of Listing 2 only in case of structure variables assumed to be in registers are actually allocated in CPU registers and when the number of MC blocks per MB is high.

TABLE 2

| Number of MC per MB | Number of copies S-R | | Number of copies R-S | | Number of copied R—R | | Total Number of copies | |
|---|---|---|---|---|---|---|---|---|
| | Mem | CPU | Mem | CPU | Mem | CPU | Mem | CPU |
| 1 | 1 | 1 | 1 | 1 | 2 | 0 | 4 | 2 |
| 2 | 1 | 1 | 1 | 2 | 3 | 0 | 5 | 3 |
| 3 | 1 | 1 | 1 | 3 | 4 | 0 | 6 | 4 |

The method next determines if the current macroblock is the last macroblock in the chunk (decision block 1013). If the current macroblock is the last macroblock (Yes at decision block 1013), then a new chunk is started at processing block 1005 and flow proceeds to this new chunk at processing block 1002. If the current macroblock is not the last macroblock (No at decision block 1013), the flow proceeds to processing block 1003 to consider the next macroblock.

After completing bbox_calc operations in the first loop all the bbox data transfers are triggered. Meanwhile when transfers for chunk N is going on for chunk N−1 reconstruction starts. This is illustrated in FIG. 6.

In past software architectures designed for smaller than HD resolution were not able to exploit full capabilities of digital signal processors because of poor I/O bandwidth utilization. The bounding box approach can reduced the number of triggers for fetching references from 3600 to 600 per frame. This invention can be optimized by varying N to arrive at optimal value for the application or for class of inputs without facing DMA submission stalls. Experiments with different values of N indicate than N of 8 is optimal for general class of MPEG-2 inputs. This invention can reduce hardware overhead from between 50 and 55% to 25%. For the example HD TV stream crew-720 p-60fps, this invention reduced the required clock rate for the digital signal processor from around 600 to 550 MHz.

What is claimed is:

1. A method for motion compensation of compressed video comprising the steps of for each macroblock in a video frame:
    updating the coordinates of a bounding box encompassing a plurality of macroblocks assuming the current macroblock is to be included in the current bounding box;
    calculating the area of the current bounding box as expanded to encompass the current macroblock;
    determining if the area of the current bounding box exceeds a maximum bounding box area;
    if the area of the current bounding box exceeds a maximum bounding box area, closing the current bounding box with dimensions before said updating coordinates and opening a new bounding box encompassing the current macroblock;
    calculating a bounding box memory utilization by a ratio of motion compensation data to bounding box data;
    if the bounding box memory utilization is less than a predetermined memory utilization threshold, closing the current bounding box with dimensions before said updating coordinates and opening a new bounding box encompassing the current macroblock; and
    upon consideration of a plurality of macroblocks for a portion of a video frame, transferring motion compensation data for the plurality of macroblocks via direct memory access data transfer of the bounding boxes.

2. The method of claim 1, further comprising the steps of:
    performing the method on a digital signal processor having a data cache of a predetermined size; and
    selecting said maximum bounding box area corresponding to said predetermined size of said data cache.

3. The method of claim 1, further comprising the steps of:
    before said step of updating the coordinates of the bounding box
        comparing a current macroblock count assuming the current macroblock is to be included in the current bounding box to a maximum macroblock count, and
        if the current macroblock count is greater than the maximum macroblock count, closing the current bounding box with dimensions before said updating coordinates and opening a new bounding box encompassing the current macroblock.

* * * * *